United States Patent [19]
Queitzsch, Jr.

[11] Patent Number: 5,234,014
[45] Date of Patent: Aug. 10, 1993

[54] FUEL CONTROL GOVERNOR

[75] Inventor: Gilbert K. Queitzsch, Jr., Renton, Wash.

[73] Assignee: Boeing Company, Seattle, Wash.

[21] Appl. No.: 827,836

[22] Filed: Jan. 29, 1992

Related U.S. Application Data

[63] Continuation of Ser. No. 670,997, Mar. 18, 1991, abandoned.

[51] Int. Cl.$^5$ .............................................. G05D 13/38
[52] U.S. Cl. ........................................ 137/56; 137/331
[58] Field of Search ................ 137/53, 56, 331, 332

[56] References Cited

U.S. PATENT DOCUMENTS

| | | |
|---|---|---|
| 1,087,818 | 2/1914 | Osborne . |
| 2,157,542 | 5/1939 | Kieser . |
| 2,229,681 | 1/1941 | Soresen . |
| 2,307,506 | 1/1943 | Huntington . |
| 2,632,473 | 3/1953 | Hollerith . |
| 2,660,421 | 11/1953 | Sorensen . |
| 2,660,422 | 11/1953 | Parker . |
| 3,251,373 | 5/1956 | Drake . |
| 3,439,694 | 4/1969 | Davis et al. . |
| 3,575,269 | 4/1971 | Sherman . |
| 3,906,975 | 9/1975 | Craig ....................... 137/56 |
| 4,791,951 | 12/1988 | Hiraiwa ...................... 137/56 |

OTHER PUBLICATIONS

Unpublished Communication by Dr. Paul Allaire (undated).
"An Analysis of the Steady State and Dynamic Characteristics of a Cylindrical-Spherical Floating Ring Bearing" by Leung and Wilkinson *IMech.E* 1988.

*Primary Examiner*—Robert G. Nilson
*Attorney, Agent, or Firm*—Dellett, Smith-Hill and Walters

[57] ABSTRACT

A mechanical fuel control governor employs a flyweight assembly for lifting the spindle of a fuel valve and allowing fuel to be bypassed from a high pressure line. The spindle is rotated via a fluid coupling between the ball head and the drive spindle such that the valve spindle rotates at a fraction of the ball head speed and whereby valve clearance and spindle leakage is reduced without reduction in the speed of the ball head.

21 Claims, 4 Drawing Sheets

FUEL CONTROL GOVERNOR

This is a continuation of application Ser. No. 07/670,997 filed Mar. 18, 1991 and now abandoned.

BACKGROUND OF THE INVENTION

The present invention relates to a fuel control governor and particularly to such a governor for achieving rapid response and low leakage rate while also providing a device of minimum size and light weight having a small number of moving parts.

An aircraft turbine engine suitably employs a mechanical fuel control governor for protecting against overspeed conditions. The governor in typical form comprises a rotating assembly having flyweights which are urged outwardly by centrifugal force, the weights operating a valve for reducing fuel pressure as engine speed becomes excessive. The metering valve need not rotate with the assembly; however, relative rotation between a valve spindle and its surrounding sleeve is advantageous in eliminating the necessity of overcoming initial axial governor actuation friction, and for clearing small debris in the fuel as might otherwise interfere with valve operation. Rotation of a metering valve component is important if the governor is to respond smoothly, rapidly and reliably.

Maximizing rotational speed of the flyweight assembly is desirable in improving sensitivity to small speed changes. Centrifugal force increases in proportion to the square of the assembly speed whereby a difference in centrifugal force is more noticeable for speed changes in a high range than if the assembly were operating at a lower speed.

However, simultaneous rotation of a valve component at near input shaft speed can be unacceptable from the standpoint of minimizing valve leakage. Minimum valve leakage is desirable for improving governing sensitivity at design speed. Leakage can be lessened through reduction of clearances, e.g. between a rotating metering spindle and the surrounding sleeve. Although a lower limit in valve clearance is determined by the size of debris in the fuel, the latter issue can be addressed by incorporating an appropriate system fuel filter, whereby spindle speed then becomes the controlling factor. Since the spindle operates in fluid film bearings, reduction of spindle clearance increases the shear gradient across the fluid film while also reducing fuel flow along the bearing axis. Both of these factors increase heat generation and the likelihood of failure if the spindle is rotated too rapidly. Consequently, from the standpoint of low valve leakage, a lower spindle speed is more attractive.

Heretofore, the attainment of high flyweight assembly speed together with a low valve rotational speed consonant with minimizing leakage has been achieved by providing a geartrain between the flyweight assembly or drive and the metering spindle for relatively reducing spindle speed. This solution, while satisfying desired design criteria, sacrifices weight and space aspects of the governor.

SUMMARY OF THE INVENTION

It is accordingly an object of the present invention to provide an improved mechanical governor operating at a high governing speed for maximizing response sensitivity to small speed changes, while also minimizing fuel valve clearance and valve leakage.

It is a further object of the present invention to provide an improved mechanical governor characterized by low metering valve spindle rotational speed.

It is a further object of the present invention to provide an improved mechanical governor characterized by minimum size, weight and number of moving parts.

It is another object of the present invention to provide an improved mechanical governor that operates at reduced metering spindle speed without reducing flyweight assembly speed or increasing system weight, size and expense.

In accordance with the present invention in a preferred embodiment thereof, a fuel control governor comprises driven means including a flyweight assembly responsive to the speed of a power plant such as a jet engine. The flyweights of this assembly are urged radially outwardly by centrifugal force causing actuation of a rotating valve member whereby the fuel supply to the power plant is reduced. A slip connection is provided between the driven means and the rotating member of the valve such that the rotating member turns at a speed substantially less than the speed of the flyweight assembly, enabling minimization of the clearance between the valve parts and consequent minimization of fuel leakage.

The above-mentioned slip connection is preferably provided by a fluid coupling utilizing fluid film shear forces, wherein the fluid comprises the engine fuel within which the governor is immersed. The fluid coupling is urged upwardly by the flyweight assembly exerting axial thrust in response to radially outward movement of the flyweights for operating the fuel valve by changing the relative axial positions of fixed and rotating members. The rotating member preferably comprises a valve spindle moved axially within a stationary sleeve and operative to divert jet fuel from a high pressure fuel pump.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
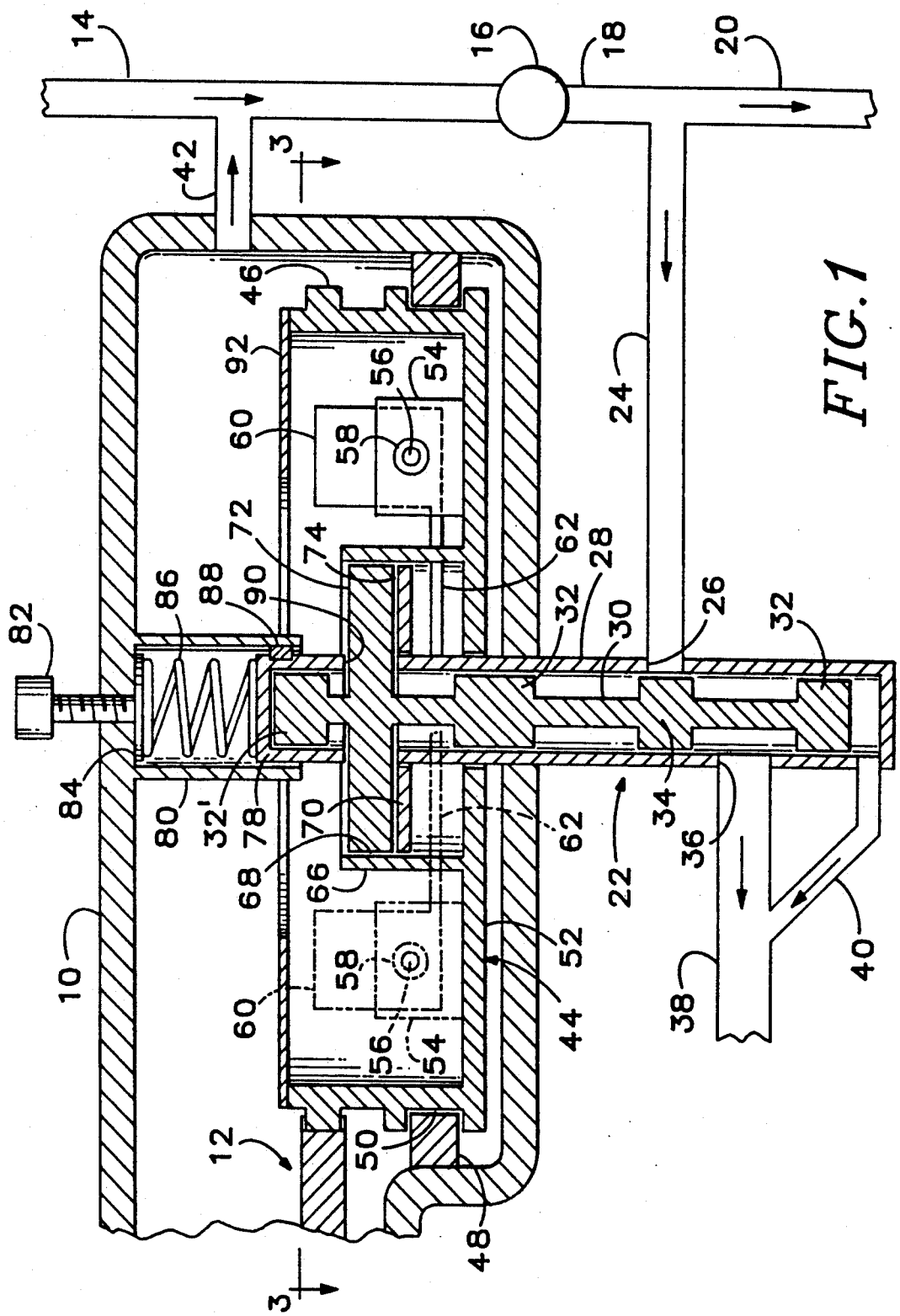
FIG. 1 is a vertical cross section of a governor according to the present invention.

Referring to the drawings, a mechanical fuel control governor in accordance with the present invention is housed within a reservoir chamber 10 into which a geartrain 12 extends, wherein the geartrain is driven from the governed rotational member of a power plant such as the rotor of an aircraft turbine engine. The geartrain, as well as the governor driven thereby, are immersed within low pressure fuel received in the chamber 10, e.g. kerosene.

Fuel from a tank or low pressure fuel source is received via conduit 14 by high pressure pump 16 for providing fuel at its outlet 18 coupled to the engine via connection 20. The pump outlet is also connected to governor valve 22 by way of tube 24 which delivers the high pressure fuel to metering orifice 26 in fixed spindle sleeve 28.

Spindle sleeve 28 sealingly extends through a mating aperture in the bottom of reservoir 10, metering spindle 30 being slideably and rotatably received within sleeve 28. Spindle 30 is provided with bearings 32 proximate the upper and lower ends of sleeve 28, these bearings comprising fluid film bearings employing jet fuel as the lubricant. Metering spindle 30 further includes metering land 34 proximate metering orifice 26 so that as spindle 30 is urged upwardly, fuel is diverted from the engine via tube 24 and through the lower portion of sleeve 28 to exit orifice 36 from which it may be delivered back to the low pressure fuel source or tank by way of tube 38. Consequently, fuel pressure and fuel supply to the engine are reduced as spindle 30 moves upwardly. An additional fuel passage 40 extends from the lower end of sleeve 28 into tube 38, it being appreciated that fuel is circulated through bearings 32 for lubrication and cooling requirements. Fuel also enters chamber 10 from the upper open end of sleeve 28, while a vent pipe 42 is provided through the upper portion of the chamber wall to allow circulation of fuel from the chamber so that excess heat is not trapped in the chamber.

The governor comprises a flyweight assembly or ball head 44 integrally incorporating a drive gear 46 at its upper cylindrical edge, the drive gear being driven from geartrain 12. Ball head 44 rotates in chamber 10 with respect to a drive gear bearing ring 48 secured to the inner wall of chamber 10. Ring 48 is received within annular channel 50 of the peripheral edge of the cylindrical ball head to provide a fluid film bearing.

Lower end disc portion 52 of the ball head carries bearing blocks 54 upstanding from disc 52 to receive journal portions 56 of flyweight shafts within flyweight pivot bearings 58. The greater mass of flyweights 60 extends upwardly from the bearings such that centrifugal force urges the upper portions of the flyweights outwardly when ball head 44 rotates. The flyweights are disposed in off center relation to the diameter of the ball head, and are provided with lower extensions in the form of flyweight balance arms 62 disposed in parallel relation with one another and with the diameter of the ball head. The balance arms pass through tangential apertures 64 in cylindrical member 66 and extend inwardly to thrust bearing pivots 76.

Figure 2:
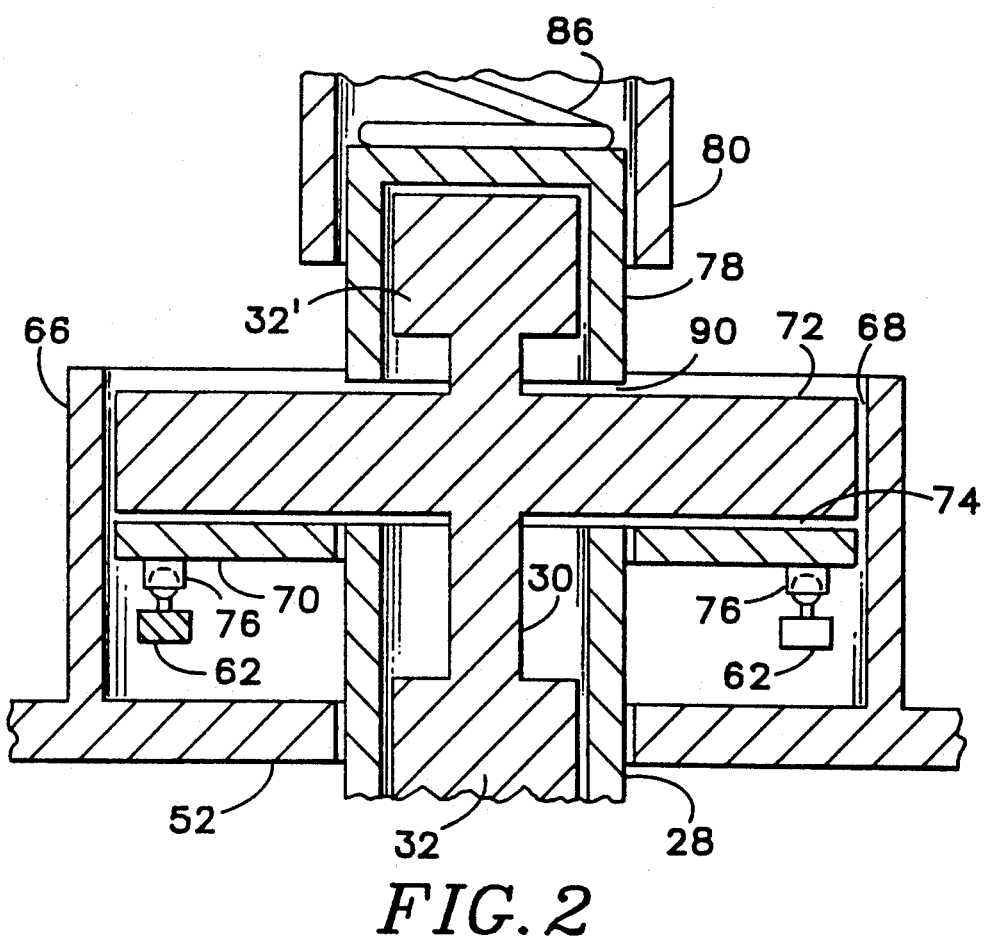
FIG. 2 is a second vertical cross section shifted by ninety degrees from the FIG. 1 view.
Figure 3:
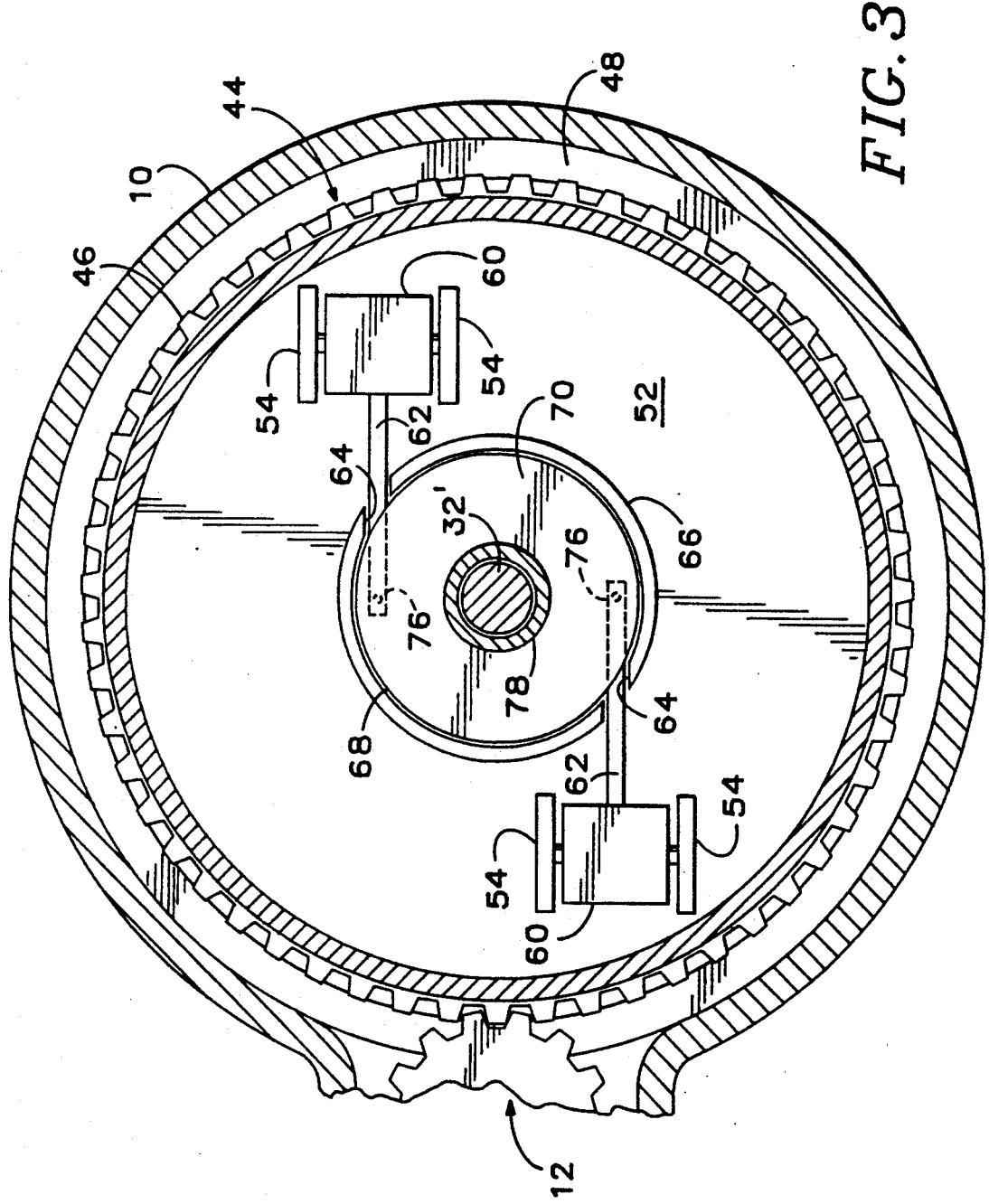
FIG. 3 is a horizontal cross section of the FIG. 1 governor as taken at 3—3 in FIG. 1.

Member 66 is integral with ball head bottom portion 52 and upstanding therefrom to provide fluid film bearings 68 at the outer peripheries of drive plate 70 and spindle drive disc 72, facing flat sides of elements 70 and 72 being disposed in juxtaposition to form a fluid film thrust bearing 74 therebetween. Spindle drive disc 72 is unitary with metering spindle 30, as can be seen from the FIG. 2 cross section. Drive plate 70 is supported by balance arm thrust bearing pivots 76 at the inner ends of flyweight balance arms 62, such pivots comprising small ball and socket joints at diametrically opposite peripheral locations on the lower side of drive plate 70.

Spindle bearing 32' at the upper end of spindle 30 is rotatably and slideably received in cup-like stop sleeve 78, in turn slideably received in centering portion 80 of chamber 10 positioned in the central upper wall of the chamber. A governing speed adjustment screw 82 threadably passes through the top wall of chamber 10 where it engages a spring plate 84 within centering sleeve 80 adapted to press against one end of stop sleeve balance spring 86, the opposite end of which engages the top of stop sleeve 78. An anti-rotation lug or key 88 is joined to stop sleeve 78 and slides in a vertical slot in centering sleeve 80 to prevent rotation of the stop sleeve. The spring 86 causes stop sleeve 78 to bear downwardly against the top surface of spindle drive disc 72 where a fluid film stop sleeve thrust bearing 90 is formed. A centrally apertured fuel shield 92 is located at the top of ball head 44 and covers flyweights 60, causing fluid around the flyweights to rotate with the flyweights thereby minimizing fluid turbulence around the flyweights.

Figure 4:
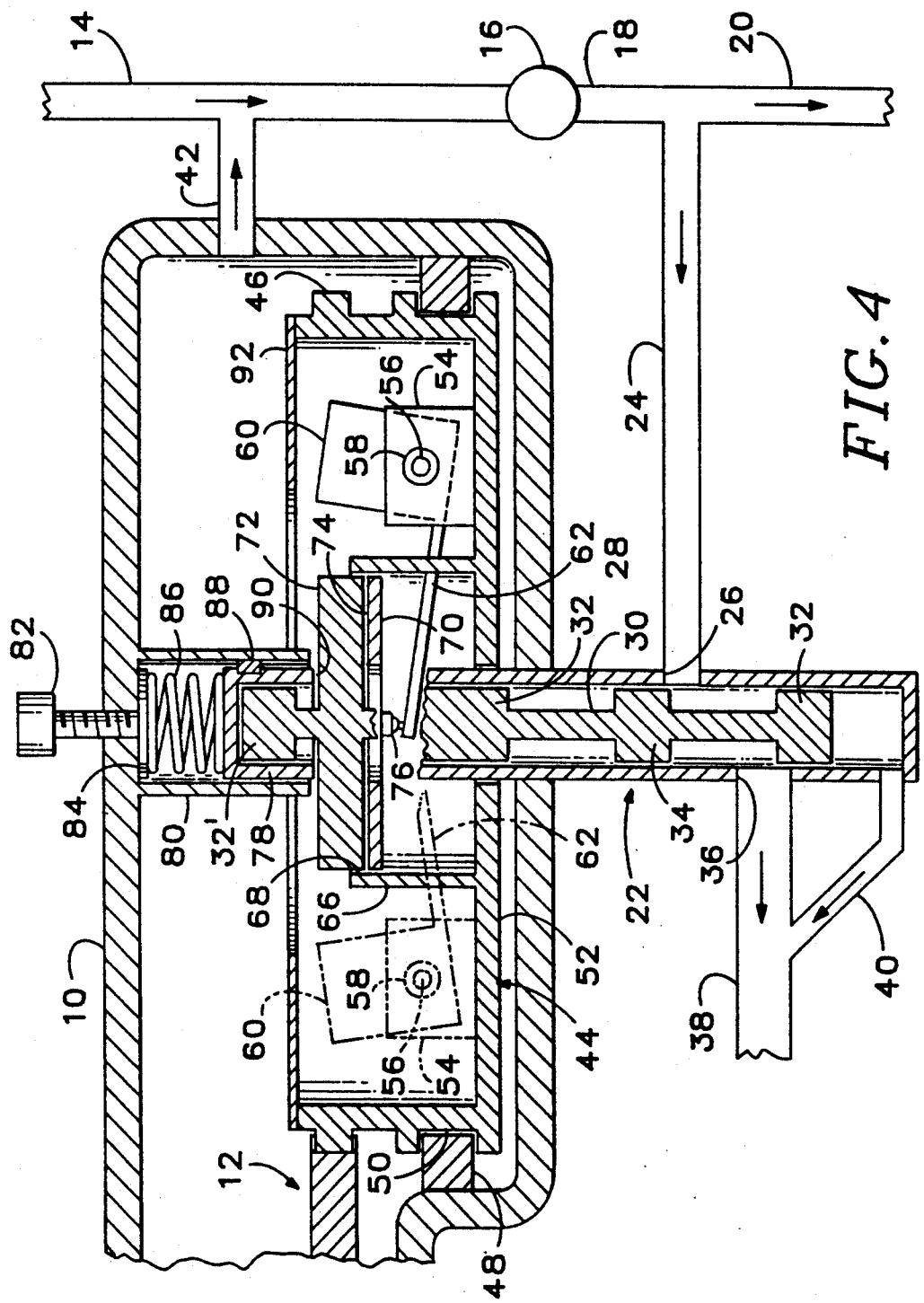
FIG. 4 is a cross section similar to FIG. 1 showing the governor flyweights urged outwardly.

Considering operation of the mechanical fuel control governor according to the present invention, pump 16 can supply fuel at a pressure appropriate for the maximum speed of the engine. As the engine rotor comes up to speed, the flyweights 60 are urged outwardly by centrifugal force whereby the flyweights pivot outwardly with respect to bearings 58, raising balance arms 62 upwardly for lifting drive plate 70 by way of pivots 76. (See FIG. 4.) The drive plate 70 bears upwardly against spindle drive disc 72, raising the latter, which also lifts spindle 30 and opens metering orifice 26. Opening the metering orifice diverts high pressure fuel from line 20 for lowering the available engine fuel pressure and reducing engine speed to a desired value.

Driving torque is also applied to spindle drive disc 72 such that metering spindle 30 and spindle metering land 34 are rotated in order to avoid sluggishness in the fuel control operation. The driving torque applied to spindle drive disc 72 arises from hydrodynamic fluid film forces exerted on spindle drive disc 72 by drive plate 70 as rotated by arms 62, i.e., via drive plate thrust bearing 74, and also from rotating cylindrical member 66 by way of bearing 68. The fluid coupling thus provided is based on fluid film shear forces, the fluid film being derived from the fuel in which the device is immersed.

At the same time, balance spring 86 forces the edge of cylindrical stop sleeve 78 downwardly against the upper side of spindle drive disc 72 where a stop sleeve thrust bearing 90 is formed in the nature of a fluid film bearing. This bearing exerts a drag torque on spindle drive disc 72 countering the drive torque delivered by bearings 74 and 68 and tending to slow down spindle drive disc 72. Operating speed for the drive disc 72 and the metering spindle 30 is established through balancing the drive torque applied by means of bearings 74 and 68 on the one hand, and the drag torque of sleeve thrust bearing 90 and spindle bearings 32 on the other. In a typical application, the spindle drive disc 72, and therefore the metering spindle 30, rotate at a speed between one third and one half the rotational speed of drive gear 46. The slower spindle speed enables closer tolerances for the valve comprising land 34 and spindle sleeve as well as for the spindle bearings whereby fuel leakage is reduced and sensitivity near the design governing speed is improved. This result is accomplished without sacrificing the rotational speed of the flyweight assembly such that sensitivity to small speed changes is enhanced. Furthermore, the speed reduction for the valve spindle is secured without resorting to an additional, heavy, expensive, and space-consuming geartrain for rotating the valve spindle.

In the design of a particular governor, a desired speed for the ball head can be determined as will maximize governor response at the design governing speed. Bearing clearing requirements for leakage can then be ascertained as will be consonant with the system fuel filter specifications. The design metering spindle speed can be decided upon as will rotate the spindle without the generation of excessive heat. The torque balance between the drive bearings 74 and 68 on the one hand, and the spindle bearings 90 and 32 on the other, can be determined for providing the optimized spindle speed. Characteristics for bearings 74, 90, 32 and 68 are then specified based on the transmitted torque requirements. The nature of numerical relationships to optimize speed will be apparent to those skilled in the art, the variables being the size of the opposing surfaces forming thrust bearings 74 and 90, as well as alternative provision of additional fluid drive geometries such as vanes on the outer edge of drive disc 72 where it faces member 66. In any case, a slower rotating valve spindle is accomplished according to the present invention without the use of an additional geartrain. As with conventional mechanical governors, the final governing speed is adjusted by means of screw 82 to allow the metering orifice 26 to be opened at the governor design speed. This will, of course, determine the centrifugal force required for raising the metering spindle 30 sufficiently for opening the orifice.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A governor for a power plant, said governor comprising:
   a valve connected in control relation to said power plant, said valve having a first member, and a second member with respect to which the first member rotates,
   driven means including a ball head supporting plural flyweights and responsive to the speed of said power plant for urging said flyweights radially outwardly by centrifugal force, the operation of said valve being governed by the radial position of said flyweights, and
   fluid coupling means providing a slip connection between said driven means and said first member so that said first member rotates at a speed less than that of said ball head.

2. The governor according to claim 1 wherein said means providing a slip connection is adapted to exert axial thrust in response to the radially outward movement of said flyweights for operating said valve by changing the relative axial positions of said first and second members.

3. The governor according to claim 1 wherein said fluid coupling means comprises a thrust bearing for axially moving said first member and operating said valve in response to outward positioning of said flyweights, and
   further comprising a member which is relatively fixed rotationally and which is positioned to provide fluid coupling with said first member.

4. A governor for a power plant, said governor comprising:
   a valve connected in control relation with said power plant, said valve including a tubular member and a spindle rotationally received therewithin,
   driven means including a ball head supporting plural flyweights responsive to the speed of said power plant for urging said flyweights radially outwardly by centrifugal force, and
   fluid coupling means between said driven means and said spindle for rotating said spindle at a speed less than that of said ball head.

5. The governor according to claim 4 wherein said fluid coupling means comprises axially movable coacting members forming a thrust bearing for axially moving said spindle and operating said valve in response to outward positioning of said flyweights.

6. The governor according to claim 5 wherein said flyweights are provided with arms disposed in operative relation with said thrust bearing for causing axial movement thereof.

7. A governor for a power plant, said governor comprising:
   a valve connected in control relation to said power plant, said valve including a ported tubular member and a spindle rotationally received therewithin,
   driven means including a ball head supporting plural flyweights responsive to the speed of said power plant for urging said flyweights radially outwardly by centrifugal force,
   a first disc operationally connected to said driven means for rotation in substantial synchronism with said ball head,
   a second disc disposed in face-to-face juxtaposition with said first disc, said second disc having a driving relation with said spindle, and
   means immersing said first and second discs in fluid to provide fluid coupling between said discs for rotating said spindle.

8. The governor according to claim 7 wherein said discs are coaxial with said tubular member, said spindle and said ball head.

9. The governor according to claim 7 wherein said discs and said spindle are axially slideable and wherein said first disc is urged axially against said second disc in response to radial outward movement of said flyweights for axially sliding said spindle to operate said valve.

10. The governor according to claim 9 further including a stop member disposed in juxtaposition with a remaining face of said second disc to produce drag whereby the rotational speed of said spindle is substantially less than that of said first disc.

11. The governor according to claim 10 wherein said stop member is axially movable and including means for biasing said stop member against said second disc.

12. A governor for a power plant, said governor comprising:
   a valve connected in control relation to said power plant, said valve having a rotating member and a fixed member,
   driven means including a ball head supporting plural flyweights and responsive to the speed of said power plant for urging said flyweights radially outwardly by centrifugal force, the relative axial positions of said fixed and rotating members being governed by the radial position of said flyweights, and
   means providing a slip connection between said driven means and said rotating member so that said rotating member turns at a speed less than that of said ball head,
   wherein said means providing said slip connection comprises first and second discs immersed in a fluid and defining a fluid coupling therebetween, a first said disc being associated with said driven means and the second said disc being associated with said rotating member.

13. The governor according to claim 12 further comprising a member which is relatively fixed rotationally and which is positioned to provide fluid coupling with said second disc.

14. A governor for a power plant, said governor comprising:
a valve connected in control relation with said power plant, said valve having a first member, and a second member comprising a spindle rotationally received within said first member,
driven means including a ball head supporting plural flyweights responsive to the speed of said power plant for urging said flyweights radially outwardly by centrifugal force, and
fluid coupling means between said driven means and said spindle for rotating said spindle at a speed less than that of said ball head,
the operation of said valve being governed by the radial position of said flyweights.

15. The governor according to claim 14 wherein said fluid coupling means comprises axially movable coacting members forming a thrust bearing for axially moving said spindle and operating said valve in response to outward positioning of said flyweights.

16. The governor according to claim 15 wherein said flyweights are provided with arms disposed in operative relation with said thrust bearing for causing axial movement thereof.

17. The governor according to claim 15 wherein one of said coacting members drives said spindle, and further comprising a member which is relatively fixed rotationally and which is positioned to provide fluid coupling with the said one of said coacting members that drives said spindle.

18. A governor for a power plant, said governor comprising:
a valve connected in control relation to said power plant, said valve having a rotating member and a fixed member,
driven means including a ball head supporting plural flyweights and responsive to the speed of said power plant for urging said flyweights radially outwardly by centrifugal force, and
means providing a slip connection between said driven means and said rotating member for driving the last mentioned member to rotate at a speed less than that of said ball head,
the relative axial positions of said fixed and rotating members being governed by the radial position of said flyweights.

19. The governor according to claim 18 wherein said means providing said slip connection comprises first and second discs immersed in a fluid and defining a fluid coupling therebetween, a first said disc being associated with said driven means and the second said disc being associated with said rotating member.

20. The governor according to claim 19 further comprising a member which is relatively fixed rotationally and which is positioned to provide fluid coupling with said second disc.

21. The governor according to claim 18 wherein said means providing a slip connection is adapted to exert axial thrust in response to the radially outward movement of said flyweights for operating said valve by changing the relative axial positions of said fixed and rotating members.

* * * * *